(12) United States Patent
Kato et al.

(10) Patent No.: US 9,966,785 B2
(45) Date of Patent: May 8, 2018

(54) BICYCLE CONTROL SYSTEM

(71) Applicant: SHIMANO INC., Sakai (JP)

(72) Inventors: Ayumi Kato, Sakai (JP); Yoshiyuki Kasai, Sakai (JP); Takaya Masuda, Sakai (JP); Jun Gao, Sakai (JP)

(73) Assignee: SHIMANO INC., Sakai (JP)

(*) Notice: Subject to any disclaimer, the term of this patent is extended or adjusted under 35 U.S.C. 154(b) by 362 days.

(21) Appl. No.: 14/795,907

(22) Filed: Jul. 10, 2015

(65) Prior Publication Data

US 2017/0012455 A1    Jan. 12, 2017

(51) Int. Cl.
*B60L 1/00* (2006.01)
*B60L 3/00* (2006.01)
*H02G 3/00* (2006.01)
*H02J 7/02* (2016.01)
*B62M 9/122* (2010.01)

(52) U.S. Cl.
CPC ............ *H02J 7/025* (2013.01); *B62M 9/122* (2013.01)

(58) Field of Classification Search
CPC .. H02J 7/025; B62M 9/124; B62M 2700/006; B62J 2700/00; B62J 2099/002
USPC ........................................................ 307/9.1
See application file for complete search history.

(56) References Cited

U.S. PATENT DOCUMENTS

| 2012/0043148 A1* | 2/2012 | Brady | B60L 3/0069 180/206.5 |
| 2013/0112038 A1* | 5/2013 | Aydogan | B62M 6/50 74/594.1 |
| 2014/0102237 A1* | 4/2014 | Jordan | B62K 23/02 74/473.12 |
| 2017/0201130 A1* | 7/2017 | Park | H02J 50/15 |

* cited by examiner

*Primary Examiner* — Carlos Amaya
(74) *Attorney, Agent, or Firm* — Mori & Ward, LLP

(57) ABSTRACT

A bicycle control system comprises a first bicycle component and a second bicycle component. The first bicycle component is configured to be mounted to a bicycle and to perform wireless communication. The second bicycle component is configured to be mounted to the bicycle and to perform wireless communication. At least one of the first and second bicycle components is configured to be electrically connected to a battery. One of the first and second bicycle components is configured to wirelessly output a pairing demand signal to the other of the first and second bicycle components in response to charging of the battery.

25 Claims, 19 Drawing Sheets

BICYCLE CONTROL SYSTEM

BACKGROUND OF THE INVENTION

Field of the Invention

The present invention relates to a bicycle control system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electrical bicycle component that is electrically operated.

SUMMARY OF THE INVENTION

In accordance with a first aspect of the present invention, a bicycle control system comprises a first bicycle component and a second bicycle component. The first bicycle component is configured to be mounted to a bicycle and to perform wireless communication. The second bicycle component is configured to be mounted to the bicycle and to perform wireless communication. At least one of the first and second bicycle components is configured to be electrically connected to a battery. One of the first and second bicycle components is configured to wirelessly output a pairing demand signal to the other of the first and second bicycle components in response to charging of the battery.

In accordance with a second aspect of the present invention, the bicycle control system according to the first aspect further comprises the battery and a plug receiver. The plug receiver is configured to receive an electric plug for charging the battery. The one of the first and second bicycle components is configured to wirelessly output the pairing demand signal to the other of the first and second bicycle components in response to receiving the plug at the plug receiver.

In accordance with a third aspect of the present invention, the bicycle control system according to the second aspect is configured so that one of the first and second bicycle components includes the battery and the plug receiver.

In accordance with a fourth aspect of the present invention, the bicycle control system according to the first aspect further comprise the battery and a wireless charging part. The wireless charging part is configured to wirelessly receive electricity for charging the battery. The one of the first and second bicycle components is configured to wirelessly output the pairing demand signal to the other of the first and second bicycle components in response to the charging of the battery via the wireless charging part.

In accordance with a fifth aspect of the present invention, the bicycle control system according to the fourth aspect is configured so that one of the first and second bicycle components includes the battery and the wireless charging part.

In accordance with a sixth aspect of the present invention, the bicycle control system comprises a first bicycle component and a second bicycle component. The first bicycle component is configured to be mounted to a bicycle and to perform wireless communication. The second bicycle component is configured to be mounted to the bicycle and to perform wireless communication. One of the first and second bicycle components is configured to wirelessly output a pairing demand signal to the other of the first and second bicycle components in response to changing into a power-on state of the one of the first and second bicycle components.

In accordance with a seventh aspect of the present invention, the bicycle control system according to the sixth aspect further comprises a power switch. The one of the first and second bicycle components is configured to change into the power-on state in response to a power-on operation to the power switch.

In accordance with an eighth aspect of the present invention, the bicycle control system according to the seventh aspect is configured so that the one of the first and second bicycle components includes the power switch.

In accordance with a ninth aspect of the present invention, the bicycle control system according to the sixth aspect is configured so that the one of the first and second bicycle components is configured to change into the power-on state in response to the one of the first and second bicycle components being electrically connecting to a battery.

In accordance with a tenth aspect of the present invention, the bicycle control system comprises a first bicycle component, a second bicycle component, and a detector. The first bicycle component is configured to be mounted to a bicycle and to perform wireless communication. The second bicycle component is configured to be mounted to the bicycle and perform wireless communication. The detector is configured to detect a load applied to the bicycle. One of the first and second bicycle components is configured to wirelessly output a pairing demand signal to the other of the first and second bicycle components in response to detecting the load of the detector.

In accordance with an eleventh aspect of the present invention, the bicycle control system according to the tenth aspect is configured so that the detector is provided to a crank assembly of the bicycle and detects the load applied to the crank assembly.

In accordance with a twelfth aspect of the present invention, the bicycle control system according to the tenth aspect is configured so that the detector is provided to a bicycle frame of the bicycle and detects the load applied to the bicycle frame.

In accordance with a thirteenth aspect of the present invention, the bicycle control system according to the tenth aspect is configured so that the detector is provided to a handlebar of the bicycle and detects the load applied to the handlebar.

In accordance with a fourteenth aspect of the present invention, the bicycle control system according to the tenth aspect is configured so that the detector is provided to a stem of the bicycle and detects the load applied to the stem.

In accordance with a fifteenth aspect of the present invention, the bicycle control system according to the tenth aspect is configured so that the detector is provided to a saddle of the bicycle and detects the load applied to the saddle.

In accordance with a sixteenth aspect of the present invention, the bicycle control system according to the tenth aspect is configured so that the detector is provided to a suspension of the bicycle and detects the load applied to the suspension.

In accordance with a seventeenth aspect of the present invention, the bicycle control system according to the first aspect is configured so that the first bicycle component includes at least one shift operating device configured to output a shift signal. The second bicycle component includes at least one bicycle shift device configured to shift speed stages of the bicycle in response to the shift signal.

In accordance with an eighteenth aspect of the present invention, the bicycle control system according to the sixth aspect is configured so that the first bicycle component includes at least one shift operating device configured to output a shift signal. The second bicycle component includes at least one bicycle shift device configured to shift speed stages of the bicycle in response to the shift signal.

In accordance with a nineteenth aspect of the present invention, the bicycle control system according to the tenth aspect is configured so that the first bicycle component includes at least one shift operating device configured to output a shift signal. The second bicycle component includes at least one bicycle shift device configured to shift speed stages of the bicycle in response to the shift signal.

In accordance with a twentieth aspect of the present invention, the bicycle control system for a bicycle according to the first aspect further comprises a memory. The memory is configured to store pairing information. The one of the first and second bicycle components is configured to be prohibited to output the pairing demand signal if the memory stores pairing information related to the first and second bicycle components.

In accordance with a twenty-first aspect of the present invention, the bicycle control system according to the first aspect further comprises a memory. The memory is configured to store pairing information. The other of the first and second bicycle components is configured to be prohibited to respond to the pairing demand signal if the memory stores pairing information related to the first and second bicycle components.

In accordance with a twenty-second aspect of the present invention, the bicycle control system for a bicycle according to the sixth aspect further comprises a memory. The memory is configured to store pairing information. The one of the first and second bicycle components is configured to be prohibited to output the pairing demand signal if the memory stores pairing information related to the first and second bicycle components.

In accordance with a twenty-third aspect of the present invention, the bicycle control system according to the sixth aspect further comprises a memory. The memory is configured to store pairing information. The other of the first and second bicycle components is configured to be prohibited to respond to the pairing demand signal if the memory stores pairing information related to the first and second bicycle components.

In accordance with a twenty-fourth aspect of the present invention, the bicycle control system for a bicycle according to the tenth aspect further comprises a memory. The memory is configured to store pairing information. The one of the first and second bicycle components is configured to be prohibited to output the pairing demand signal if the memory stores pairing information related to the first and second bicycle components.

In accordance with a twenty-fifth aspect of the present invention, the bicycle control system according to the tenth aspect further comprises a memory. The memory is configured to store pairing information. The other of the first and second bicycle components is configured to be prohibited to respond to the pairing demand signal if the memory stores pairing information related to the first and second bicycle components.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
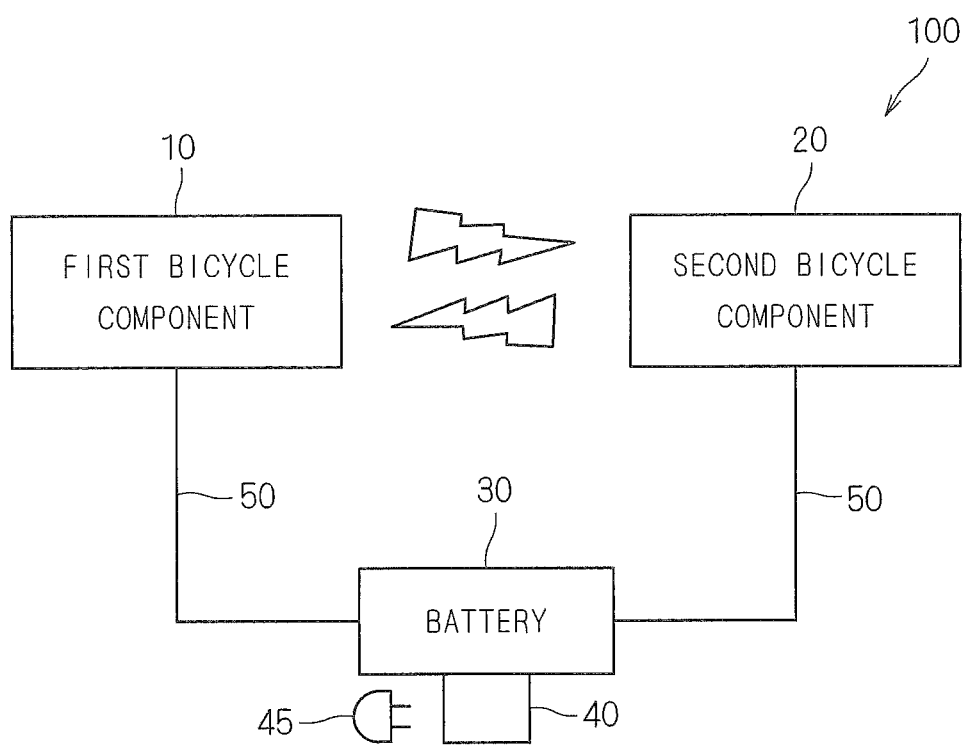
FIG. 1 is a block diagram illustrating a configuration of a bicycle control system in accordance with a first embodiment.

The embodiments will now be described with reference to the accompanying drawings, wherein like reference numerals designate corresponding or identical elements throughout the various drawings.

First Embodiment

Figure 2:
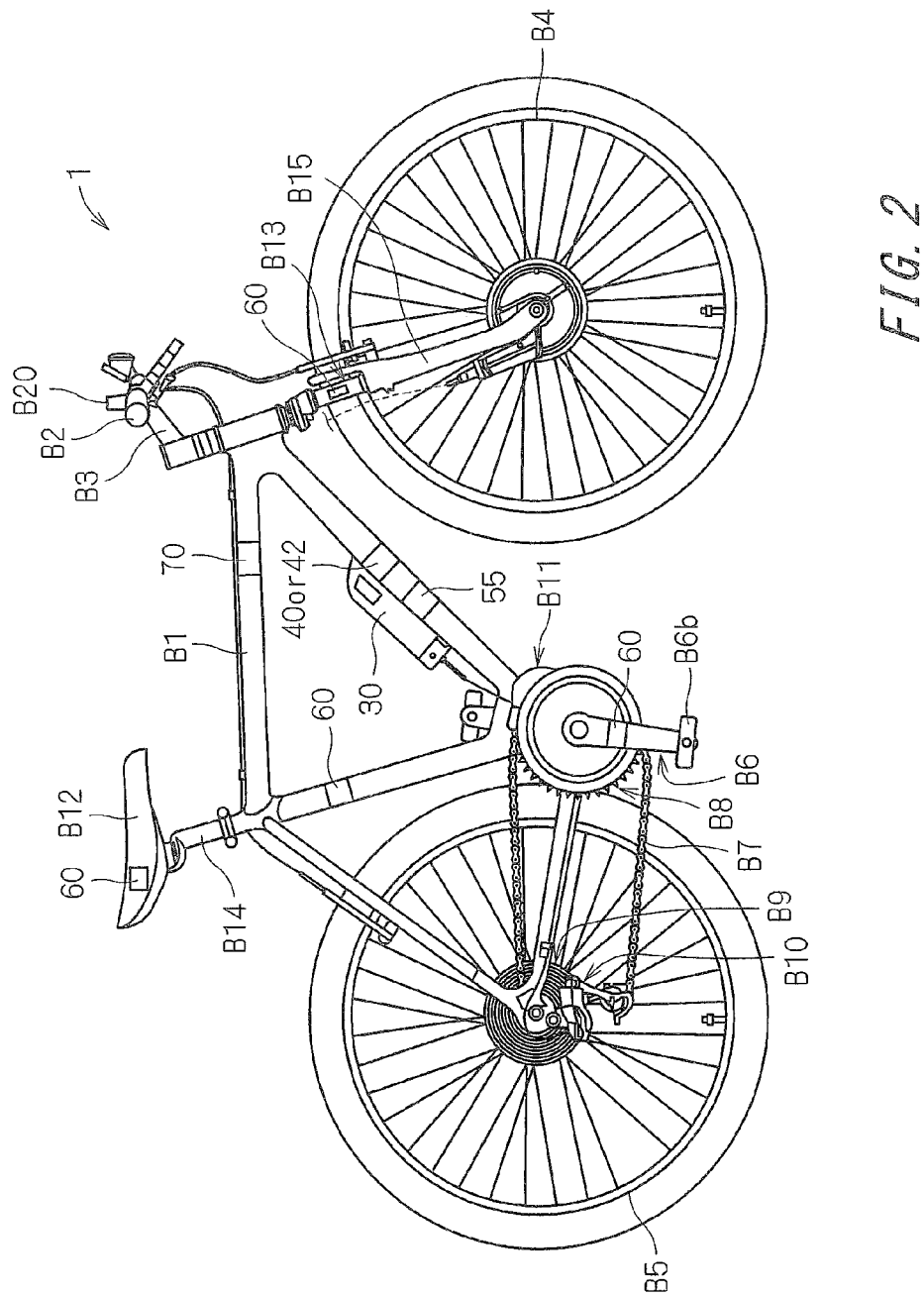
FIG. 2 is a side view of a bicycle.

FIG. 1 is a block diagram illustrating a configuration of a bicycle control system 100 in accordance with a first embodiment. The bicycle control system 100 is provided to a bicycle 1. FIG. 2 is a side view of the bicycle 1.

First, a structure of the bicycle 1 will be described briefly referring to FIG. 2.

As shown in FIG. 2, the bicycle 1 includes a bicycle frame B1, a handlebar B2, a stem B3, wheels B4 and B5, a crank assembly B6, a bicycle chain B7, a front sprocket B8, a rear sprocket B9, a rear shift device B10, a front shift device B11, a saddle B12, a suspension B13, and a seatpost B14.

The handlebar B2 is mounted to the bicycle frame B1 through the stem B3. The wheel B4 is rotatably attached to the bicycle frame B1. The wheel B5 is rotatably attached to a front fork B15. The crank assembly B6 is configured to rotate relative to the bicycle frame B1. The bicycle chain B7 is provided between the front sprocket B8 and the rear sprocket B9. The rear shift device B10 and the front shift device B11 are configured to shift speed stages of the bicycle 1. The seatpost B14 is provide on the bicycle frame B1. The saddle B12 is mounted on the seatpost B14. The suspension B13 is provided to the front fork B15. An operating device B20 is mounted on the handlebar B2.

In the present application, the directional terms "front", "rear", "forward", "rearward", "left", "right", "transverse", "upward" and "downward" as well as any other similar directional terms refer to those directions which are determined on the basis of a user (e.g., a rider) who sits on the saddle B12 of the bicycle 1 with facing the handlebar B2. Accordingly, these terms, as utilized to describe bicycle components, should be interpreted relative to the bicycle 1 equipped with the bicycle components as used in an upright riding position on a horizontal surface.

Next, a configuration of the bicycle control system 100 will be described referring to FIG. 1.

The bicycle control system 100 comprises a first bicycle component 10 and a second bicycle component 20. The bicycle control system 100 further comprises a battery 30 and a plug receiver 40.

The first bicycle component 10 is configured to be mounted to the bicycle 1 and to perform wireless communication. The second bicycle component 20 is configured to be mounted to the bicycle 1 and to perform wireless communication. For example, the first bicycle component 10 is configured to perform the wireless communication with the second bicycle component 20.

As the first bicycle component 10 and the second bicycle component 20, any device which performs the wireless communication and is mounted on the bicycle 1 can be adopted. As the first bicycle component 10 and the second bicycle component 20, for example, the operation device B20, the rear shift device B10, the front shift device B11, the adjustable suspension B13, and the adjustable seatpost B14 which have a wireless communication function can be adopted. However, the first bicycle component 10 is different from the second bicycle component 20.

Figure 3:
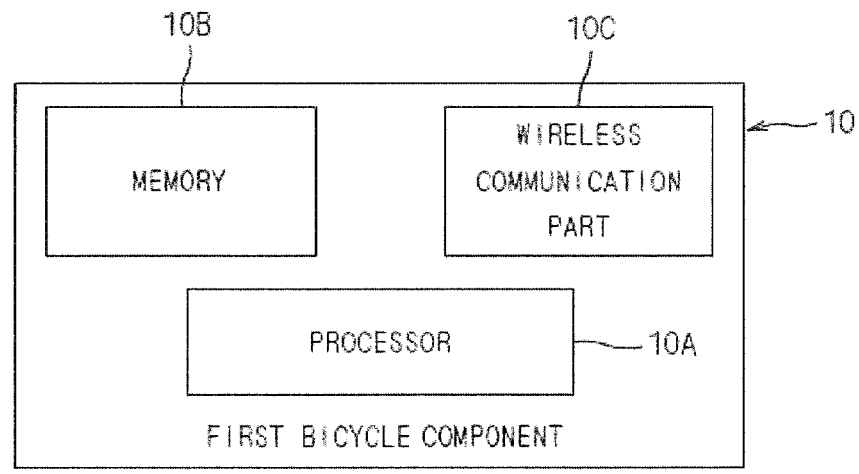
FIG. 3 is an enlarged block diagram illustrating a configuration of a first bicycle component.

FIG. 3 is a block diagram illustrating a configuration of the first bicycle component 10. As seen in FIG. 3, the first bicycle component 10 is constituted as a microcomputer and includes a processor 10A and a memory 10B. The processor 10A includes a central processing unit (CPU). The memory 10B includes a read only memory (ROM) and a random access memory (RAM). For example, a program stored in the memory 10B is read into the processor 10A, and thereby functions of the first bicycle component 10 are performed. The first bicycle component 10 also includes a wireless communication part 10C. The wireless communication part 10C is configured to perform the wireless communication under control of the processor 10A.

Figure 4:
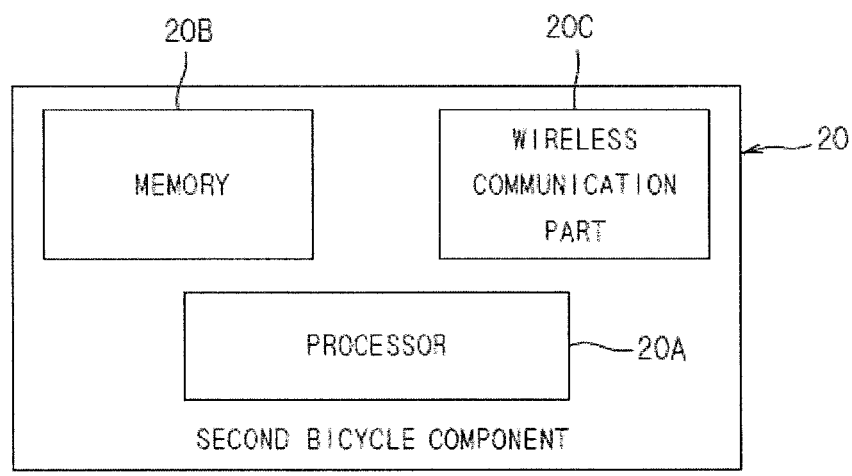
FIG. 4 is an enlarged block diagram illustrating a configuration of a second bicycle component.

FIG. 4 is a block diagram illustrating a configuration of the second bicycle component 20. Similarly, as seen in FIG. 4, the second bicycle component 20 is constituted as a microcomputer and includes a processor 20A and a memory 20B. The processor 20A includes a CPU. The memory 20B includes a ROM and a RAM. For example, a program stored in the memory 20B is read into the processor 20A, and thereby functions of the second bicycle component 20 are performed. The second bicycle component 20 also includes a wireless communication part 20C. The wireless communication part 20C is configured to perform the wireless communication under control of the processor 20A.

At least one of the first and second bicycle components 10 and 20 is configured to be electrically connected to the battery 30. Namely, the battery 30 is configured to supply electric power to at least one of the first bicycle component 10 and second bicycle components 20. In FIG. 1, both of the first bicycle component 10 and second bicycle components 20 are electrically connected to the battery 30. Namely, the battery 30 supplies the electric power to both of the first bicycle component 10 and second bicycle components 20.

Figure 5:
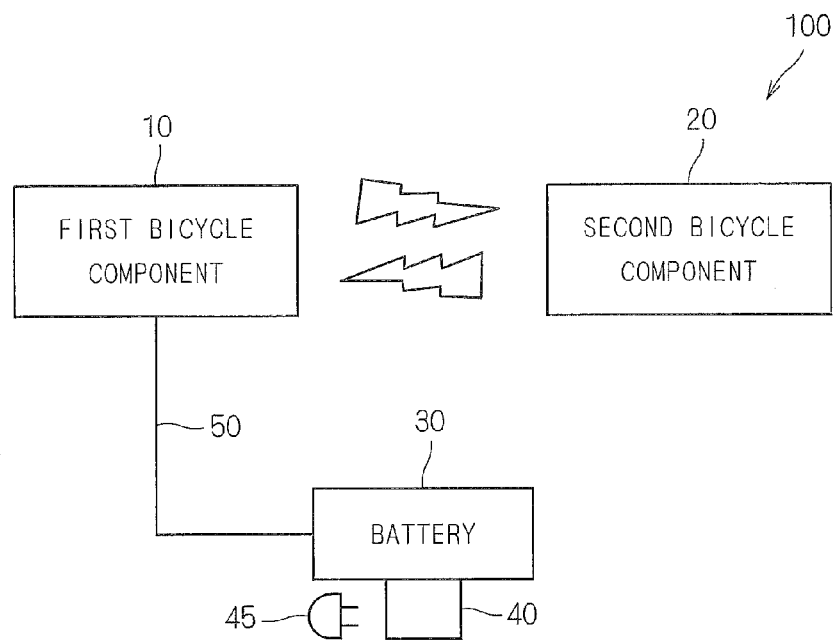
FIGS. 5 and 6 are block diagrams illustrating other configurations of the bicycle control system in accordance with the first embodiment.
Figure 6:
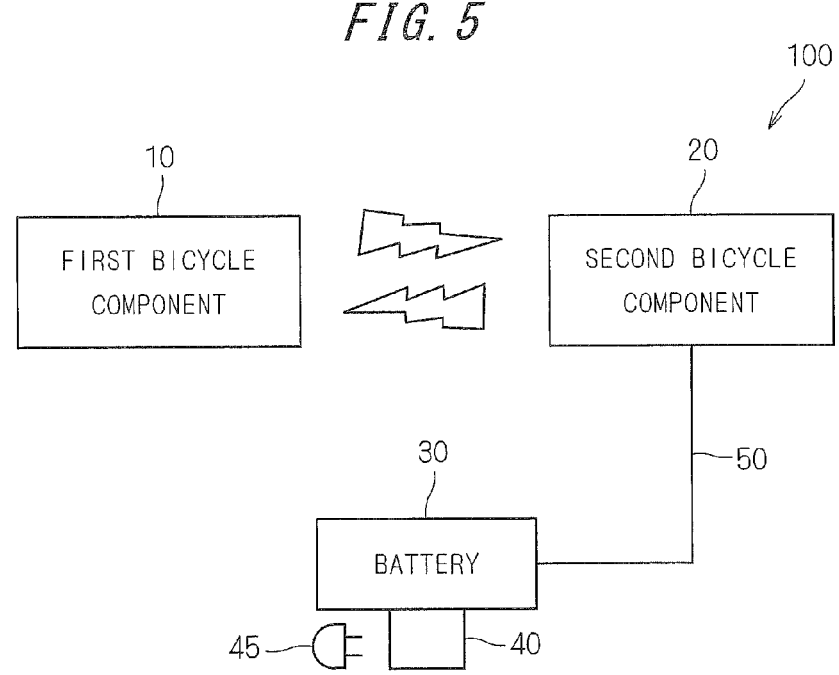

However, each of configurations shown in FIGS. 5 and 6 can be adopted, if needed and/or desired. In FIG. 5, the first bicycle component 10 is electrically connected to the battery 30. Namely, in FIG. 5, the battery 30 supplies the electric power to the first bicycle component 10, on the other hand, the battery 30 does not supply the electric power to the second bicycle component 20. In FIG. 6, the second bicycle component 20 is electrically connected to the battery 30. Namely, in FIG. 6, the battery 30 supplies the electric power to the second bicycle component 20, on the other hand, the battery 30 does not supply the electric power to the first bicycle component 10.

At least one of the first and second bicycle components 10 and 20 is connected to the battery 30 through a Power Line Communication (PLC) 50. Therefore, it is possible for at least one of the first and second bicycle components 10 and 20 to communicate with the battery 30 through the PLC 50.

For example, as shown in FIG. 2, the battery 30 can be mounted on the bicycle frame B1. The battery 30 can supply the electric power to any other bicycle components, if needed and/or desired. The battery 30 is configured to charge and discharge the electric power. For example, as shown in FIGS. 1, 5, and 6, the plug receiver 40 is configured to be electrically connected to the battery 30. For example, as shown in FIG. 2, the plug receiver 40 is mounted on the bicycle frame B1. The plug receiver 40 is configured to receive an electric plug 45 for charging the battery 30. The battery 30 and the plug receiver 40 are provided separately from the first bicycle component 10 and the second bicycle component 20.

One of the first and second bicycle components 10 and 20 is configured to wirelessly output a pairing demand signal to the other of the first and second bicycle components 10 and 20 in response to charging of the battery 30. For example, the first bicycle component 10 is configured to wirelessly output the pairing demand signal to the second bicycle component 20 in response to charging of the battery 30, or the second bicycle component 20 is configured to wirelessly output the pairing demand signal to the first bicycle component 10 in response to charging of the battery 30.

In FIGS. 1, 5, and 6, the one of the first and second bicycle components 10 and 20 is configured to wirelessly output the pairing demand signal to the other of the first and second bicycle components 10 and 20 in response to receiving the electric plug 45 at the plug receiver 40.

In FIG. 1, when the plug receiver 40 receives the electric plug 45, the battery 30 is charged and sends a charging signal to the first bicycle component 10 and the second bicycle component 20 through the PLC 50. Then, the first bicycle component 10 wirelessly outputs the pairing demand signal to the second bicycle component 20 in response to receiving the charging signal, or the second bicycle component 20 wirelessly outputs the pairing demand signal to the first bicycle component 10 in response to receiving the charging signal.

In FIG. 5, when the plug receiver 40 receives the electric plug 45, the battery 30 is charged and sends the charging signal to the first bicycle component 10 through the PLC 50. Then, the first bicycle component 10 wirelessly outputs the pairing demand signal to the second bicycle component 20 in response to receiving the charging signal. Or the first bicycle component 10 wirelessly outputs the charging signal by a broadcast transmission, then the second bicycle component 20 wirelessly outputs the pairing demand signal to the first bicycle component 10 in response to receiving the charging signal from the first bicycle component 10.

In FIG. 6, when the plug receiver 40 receives the electric plug 45, the battery 30 is charged and sends the charging signal to the second bicycle component 20 through the PLC 50. Then, the second bicycle component 20 wirelessly outputs the pairing demand signal to the first bicycle component 10 in response to receiving the charging signal. Or the second bicycle component 20 wirelessly outputs the charging signal by the broadcast transmission, then the first bicycle component 10 wirelessly outputs the pairing demand signal to the second bicycle component 20 in response to receiving the charging signal from the second bicycle component 20.

Next, an operation of the bicycle control system 100 will be described based on a specific configuration example. The first bicycle component 10 and the second bicycle component 20 include any component which is mounted on the bicycle 1 and performs the wireless communication. In the specific configuration example, the first bicycle component 10 includes at least one shift operating device B20 and the second bicycle component 20 includes at least one bicycle shift device B10 or B11 (see, FIG. 2). The shift operating device B20 is configured to output a shift signal. The shift device B10 or B11 is configured to shift speed stages of the bicycle 1 in response to the shift signal.

In the following description, more specifically, the first bicycle component 10 is the shift operating device B20 and the second bicycle component 20 is the rear shift device B10. The shift operating device B20 is configured to receive an input operation regarding shifting from a user. When the shift operating device B20 receives the input operation, the shift operating device B20 wirelessly outputs the shift signal to the rear shift device B10. When the rear shift device B10 wirelessly receives the shift signal, the rear shift device B10 shifts the bicycle chain B7 at the rear sprocket B9.

Figure 7:
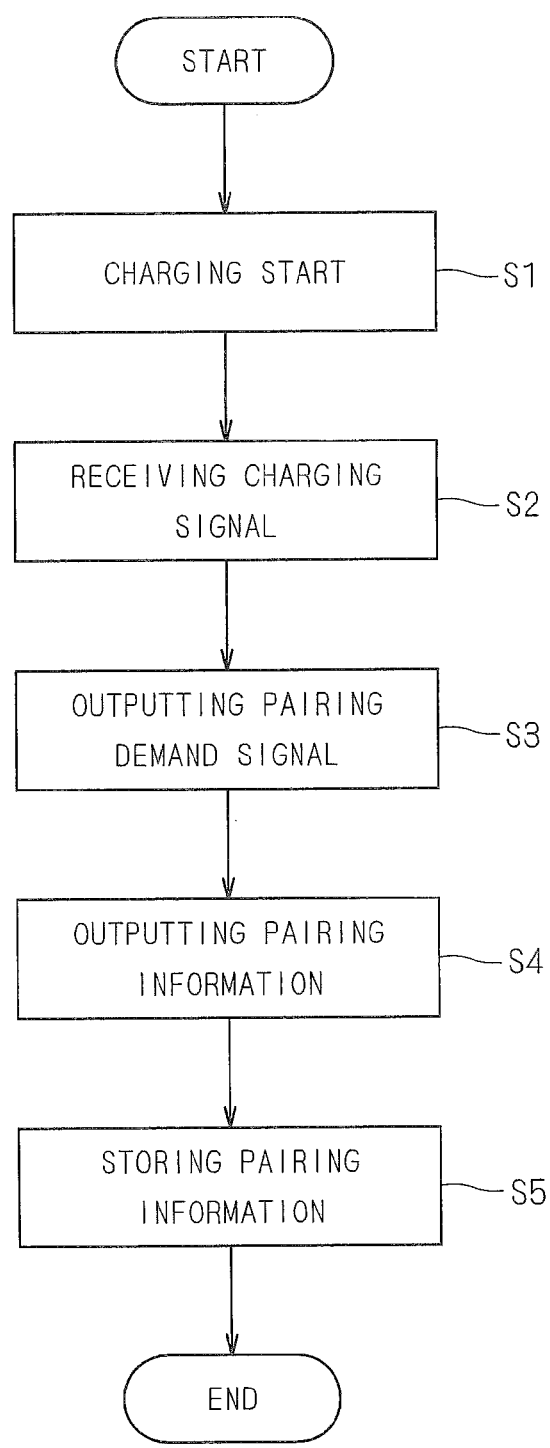
FIG. 7 is a diagram for explaining an operation of the bicycle control system in accordance with the first embodiment.

Referring to FIG. 7, in a case where the rear shift device B10 outputs the pairing demand signal to the shift operating device B20, the operation of the bicycle control system 100 will be described.

In FIGS. 1 and 6, when the plug receiver 40 receives the electric plug 45, the battery 30 starts charging (step S1). The battery 30 also sends the charging signal to the second bicycle component 20 (the rear shift device B10) through the PLC 50. Then, the rear shift device B10 receives the charging signal (step S2). Next, the rear shift device B10 wirelessly outputs the pairing demand signal to the first bicycle component 10 (the shift operating device B20) in response to receiving the charging signal (step S3).

Unlike FIGS. 1 and 6, in FIG. 5, when the plug receiver 40 receives the electric plug 45, the battery 30 starts charging (step S1). The battery 30 also sends the charging signal to the shift operating device B20 through the PLC 50. Then, the shift operating device B20 receives the charging signal. The shift operating device B20 wirelessly outputs the charging signal by the broadcast transmission. Then, the rear shift device B10 receives the charging signal from the shift operating device B20 (step S2). Next, the rear shift device B10 wirelessly outputs the pairing demand signal to the shift operating device B20 in response to receiving the charging signal (step S3).

After step S3, the shift operating device B20 wirelessly receives the pairing demand signal. When the pairing demand signal has come from a pairing partner of the shift operating device B20, the shift operating device B20 wirelessly outputs pairing information to the rear shift device B10 in response to receiving the pairing demand signal (step S4). The pairing information includes identification information data of the shift operating device B20.

It is assumed that a pairing between the shift operating device B20 and the rear shift device B10 is established and a pairing between the shift operating device B20 and the front shift device B11 is not established. In this assumption, when the shift operating device B20 wirelessly receives the pairing demand signal, the shift operating device B20 determines whether the pairing demand signal has been output from the rear shift device B10 or not.

For example, a first pairing demand signal output from the rear shift device B10 has a first radio wave intensity, and a second pairing demand signal output from the front shift device B11 has a second radio wave intensity. The first radio wave intensity is different from the second radio wave intensity, because a first distance between the shift operating device B20 and the rear shift device B10 is different from a second distance between the shift operating device B20 and the front shift device B11. As shown in FIG. 2, since the first distance is larger than the second distance, the first radio wave intensity is smaller than the second radio wave intensity. Therefore, the shift operating device B20 determines that the pairing demand signal has been output from the rear shift device B10 by detecting a radio wave intensity of the pairing demand signal.

For example, the shift operating device B20 has a radio wave intensity threshold, and the shift operating device B20 compares the radio wave intensity of the pairing demand signal which the shift operating device B20 receives with the radio wave intensity threshold. If the shift operating device B20 detects that the radio wave intensity of the pairing demand signal is smaller than the radio wave intensity threshold, the shift operating device B20 determines that the pairing demand signal has been output from the rear shift device B10. On the other hand, if the shift operating device B20 detects that the radio wave intensity of the pairing demand signal is equal or larger than the radio wave intensity threshold, the shift operating device B20 determines that the pairing demand signal has been output from the front shift device B11.

After step S4, the rear shift device B10 wirelessly receives the pairing information. Then, the rear shift device B10 stores the pairing information in the memory 20B in FIG. 4 (step S5). The pairing between the shift operating device B20 and the rear shift device B10 is established through a series of processes (from step S1 to step S5).

With the bicycle control system 100, it is possible to start a pairing process without performing a particular operation for the pairing process. Accordingly, with the bicycle control system 100, the convenience of the user can be improved.

Second Embodiment

The bicycle control system 200 in accordance with a second embodiment has substantially the same configuration as the bicycle control system 100 in accordance with the first embodiment except for the following things. Thus, elements having substantially the same function as those in the first embodiment will be numbered the same here, and will not be described and/or illustrated again in detail here for the sake of brevity.

In the first embodiment, the battery 30 and the plug receiver 40 are mounted on bicycle frame B1. Namely, the battery 30 and the plug receiver 40 are provided outside of the first bicycle component 10 and the second bicycle component 20.

Figure 8:
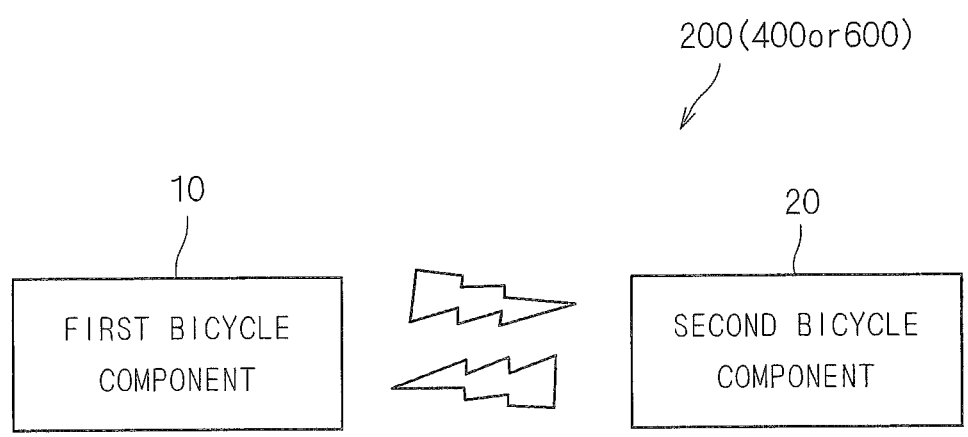
FIG. 8 is a block diagram illustrating a configuration of the bicycle control system in accordance with second, fourth, and sixth embodiments.
Figure 9:
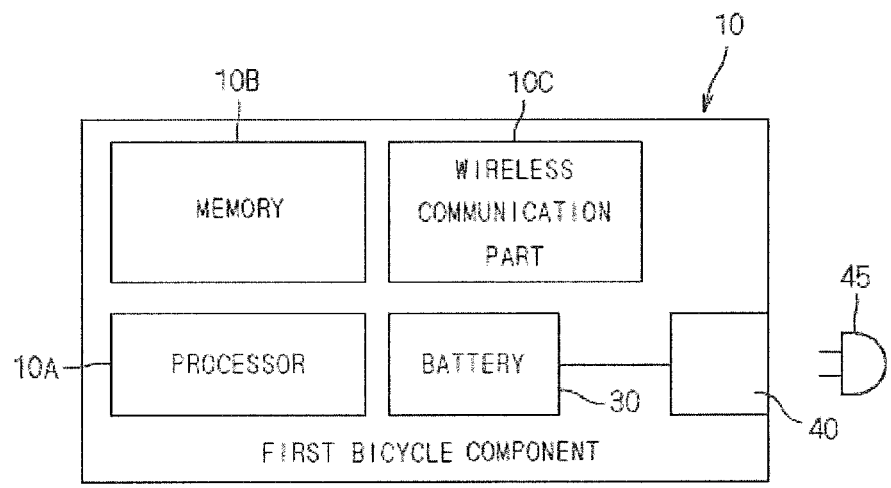
FIG. 9 is an enlarged block diagram illustrating a configuration of the first bicycle component.
Figure 10:
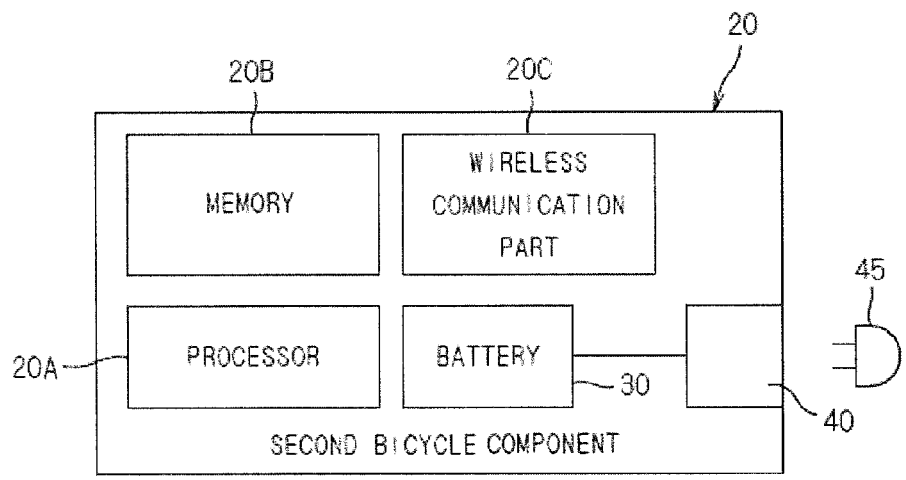
FIG. 10 is an enlarged block diagram illustrating a configuration of the second bicycle component.

In the bicycle control system 200 in accordance with the second embodiment, one of the first and second bicycle components 10 and 20 includes the battery 30 and the plug receiver 40. FIG. 8 is a block diagram illustrating a configuration of the bicycle control system 200. FIG. 9 is a block diagram illustrating a configuration of the first bicycle component 10 in accordance with the second embodiment. FIG. 10 is a block diagram illustrating a configuration of the second bicycle component 20 in accordance with the second embodiment.

As can be seen from FIGS. 9 and 10, the first bicycle component 10 includes the battery 30 and the plug receiver 40, or the second bicycle component 20 includes the battery 30 and the plug receiver 40.

In FIG. 9, when the plug receiver 40 receives the electric plug 45, the battery 30 is charged, and the processor 10A detects charging of the battery 30. Then, as show in FIG. 8, the first bicycle component 10 wirelessly outputs the pairing demand signal to the second bicycle component 20 in response to charging of the battery 30 (namely, in response to receiving the electric plug 45 at the plug receiver 40). Instead, the first bicycle component 10 wirelessly outputs the charging signal by the broadcast transmission, then the second bicycle component 20 wirelessly outputs the pairing demand signal to the first bicycle component 10 in response to receiving the charging signal from the first bicycle component 10.

In FIG. 10, when the plug receiver 40 receives the electric plug 45, the battery 30 is charged, and the processor 20A detects charging of the battery 30. Then, as show in FIG. 8, the second bicycle component 20 wirelessly outputs the pairing demand signal to the first bicycle component 10 in response to charging of the battery 30 (namely, in response to receiving the electric plug 45 at the plug receiver 40). Instead, the second bicycle component 20 wirelessly outputs the charging signal by the broadcast transmission, then the first bicycle component 10 wirelessly outputs the pairing demand signal to the second bicycle component 20 in response to receiving the charging signal from the second bicycle component 20.

Third Embodiment

The bicycle control system 300 in accordance with a third embodiment has substantially the same configuration as the bicycle control system 100 in accordance with the first embodiment except for the following things. Thus, elements having substantially the same function as those in the first embodiment will be numbered the same here, and will not be described and/or illustrated again in detail here for the sake of brevity.

In the first embodiment, as shown in FIGS. 1, 5, and 6, the bicycle control system 100 includes the plug receiver 40 that receives the electric plug 45 for charging the battery 30.

Figure 11:
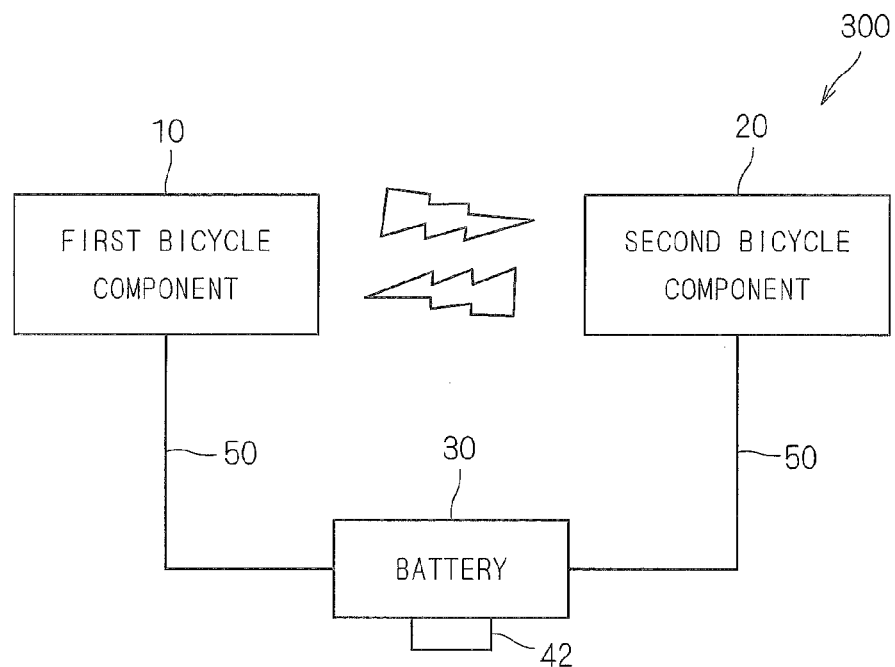
FIGS. 11, 12, and 13 are block diagrams illustrating configurations of the bicycle control systems in accordance with a third embodiment.
Figure 12:
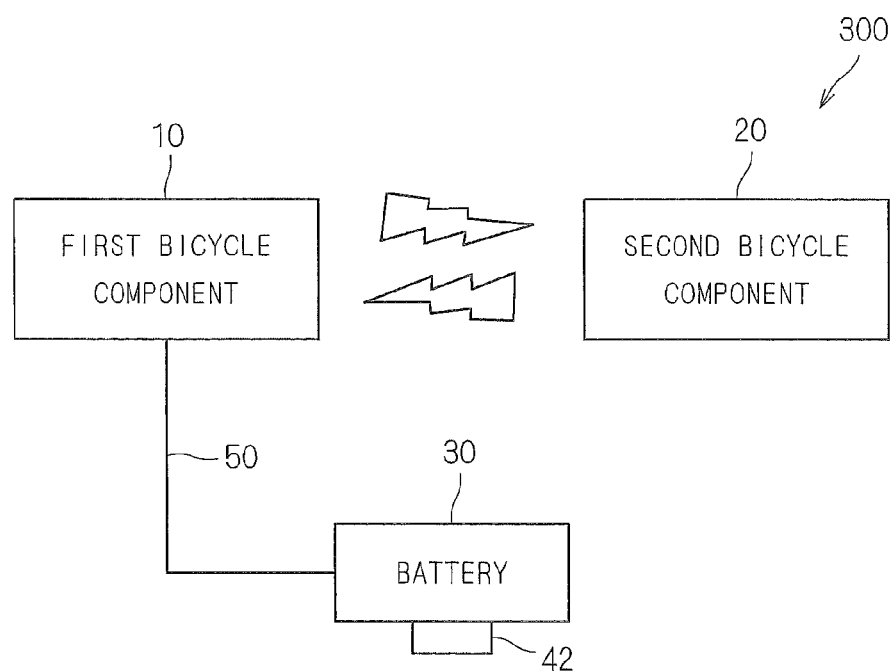
Figure 13:
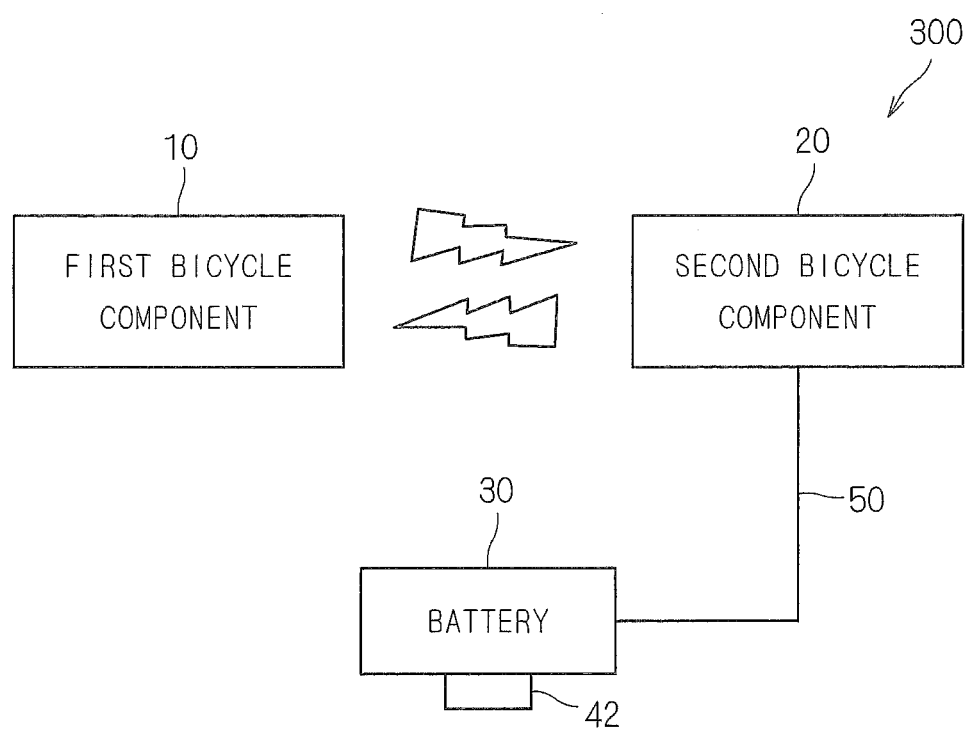

In the third embodiment, the bicycle control system 300 further comprises a wireless charging part 42. The wireless charging part 42 is configured to wirelessly receive electricity for charging the battery 30. FIGS. 11-13 are block diagrams illustrating configurations of bicycle control systems 300. FIG. 11 is corresponding to FIG. 1 (namely, the configuration of in FIG. 11 is similar to the configuration of in FIG. 1), but in FIG. 11, the plug receiver 40 is replaced with the wireless charging part 42. FIG. 12 is corresponding to FIG. 5 (namely, the configuration of in FIG. 12 is similar to the configuration of in FIG. 5), but in FIG. 12, the plug receiver 40 is replaced with the wireless charging part 42. FIG. 13 is corresponding to FIG. 6 (namely, the configuration of in FIG. 13 is similar to the configuration of in FIG. 6), but in FIG. 13, the plug receiver 40 is replaced with the wireless charging part 42.

The battery 30 is charged via the wireless charging part 42 without an electric code or an electric wire. For example, as the wireless charging part 42, an inductive charger can be adopted using an electromagnetic induction system. The wireless charging part 42 is mounted on the bicycle frame B1 (FIG. 2). The battery 30 and the wireless charging part 42 are provided separately from the first bicycle component 10 and the second bicycle component 20.

In the bicycle control system 300, the one of the first and second bicycle components 10 and 20 is configured to wirelessly output the pairing demand signal to the other of the first and second bicycle components 10 and 20 in response to charging of the battery 30 via the wireless charging part 42. Namely, the charging system is different between the bicycle control system 100 and the bicycle control system 300, but an operation of the bicycle control system 300 is the same as the operation of bicycle control system 100 (see, the above description using FIG. 7).

Fourth Embodiment

The bicycle control system 400 in accordance with a fourth embodiment has substantially the same configuration as the bicycle control system 300 in accordance with the third embodiment except for the following things. Thus, elements having substantially the same function as those in the first embodiment will be numbered the same here, and will not be described and/or illustrated again in detail here for the sake of brevity.

In the third embodiment, the battery 30 and the wireless charging part 42 are mounted on bicycle frame B1. Namely, the battery 30 and the wireless charging part 42 are provided outside of the first bicycle component 10 and the second bicycle component 20.

Figure 14:
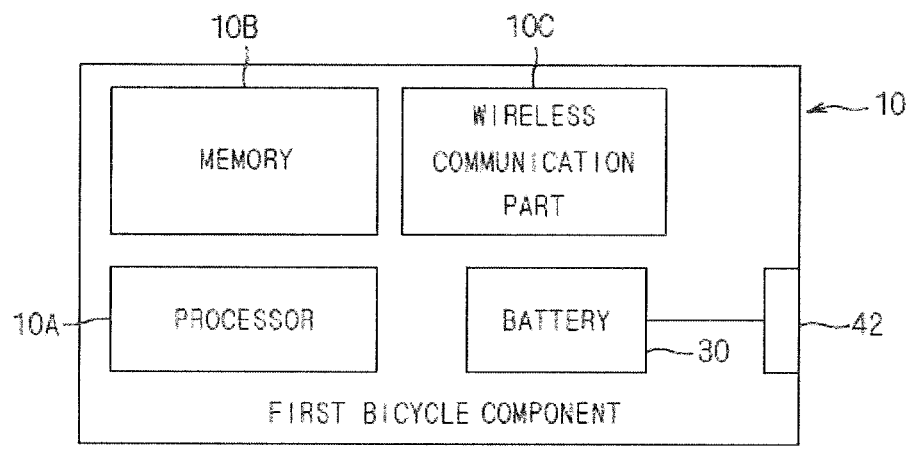
FIG. 14 is an enlarged block diagram illustrating a configuration of the first bicycle component.
Figure 15:
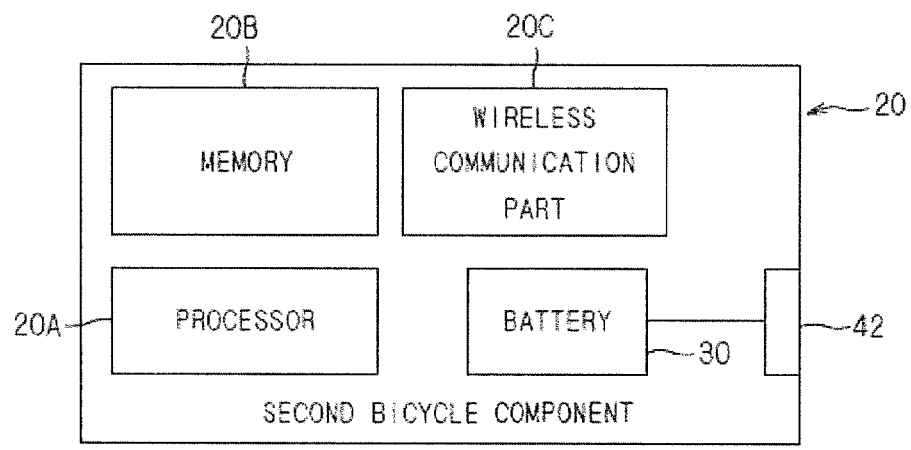
FIG. 15 is an enlarged block diagram illustrating a configuration of the second bicycle component.

In the bicycle control system 400 in accordance with the fourth embodiment, one of the first and second bicycle components 10 and 20 includes the battery 30 and the wireless charging part 42. A whole structure of the bicycle control system 400 is the same structure in FIG. 8. FIG. 14 is a block diagram illustrating a configuration of the first bicycle component 10 in accordance with the fourth embodiment. FIG. 15 is a block diagram illustrating a configuration of the second bicycle component 20 in accordance with the fourth embodiment.

As can be seen from FIGS. 14 and 15, the first bicycle component 10 includes the battery 30 and the wireless charging part 42, or the second bicycle component 20 includes the battery 30 and the wireless charging part 42.

In FIG. 14, when the wireless charging part 42 wirelessly receive the electricity, the battery 30 is charged, and the processor 10A detects charging of the battery 30. Then, as show in FIG. 8, the first bicycle component 10 wirelessly outputs the pairing demand signal to the second bicycle component 20 in response to charging of the battery 30 via the wireless charging part 42. Instead, the first bicycle component 10 wirelessly outputs the charging signal by the broadcast transmission, then the second bicycle component 20 wirelessly outputs the pairing demand signal to the first bicycle component 10 in response to receiving the charging signal from the first bicycle component 10.

In FIG. 15, when the wireless charging part 42 wirelessly receive the electricity, the battery 30 is charged, and the processor 20A detects charging of the battery 30. Then, as show in FIG. 8, the second bicycle component 20 wirelessly outputs the pairing demand signal to the first bicycle component 10 in response to charging of the battery 30 via the wireless charging part 42. Instead, the second bicycle component 20 wirelessly outputs the charging signal by the broadcast transmission, then the first bicycle component 10 wirelessly outputs the pairing demand signal to the second bicycle component 20 in response to receiving the charging signal from the second bicycle component 20.

Fifth Embodiment

Figure 16:
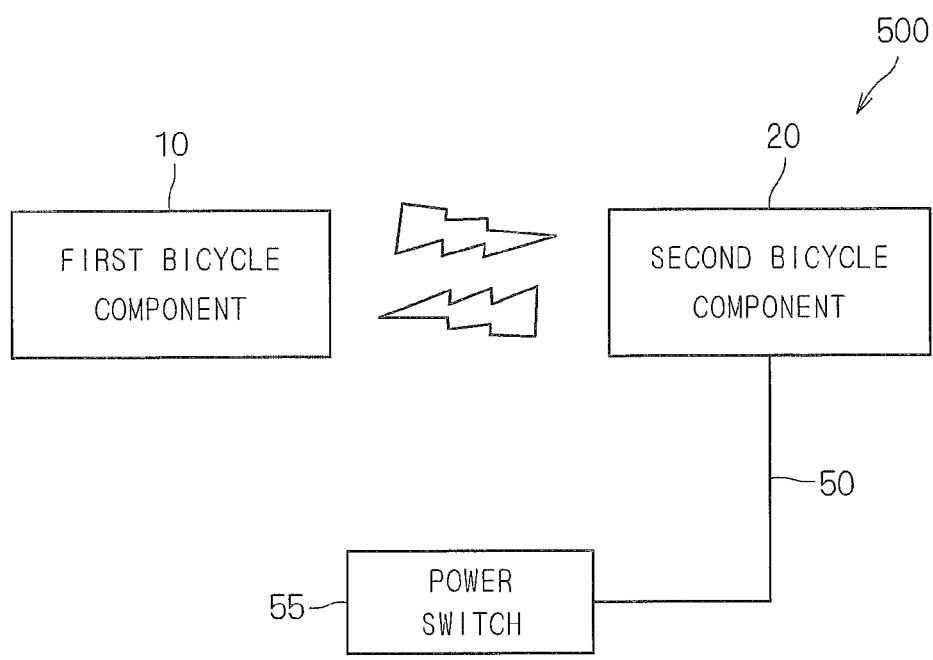
FIG. 16 is a block diagram illustrating a configuration of the bicycle control system in accordance with a fifth embodiment.

FIG. 16 is a block diagram illustrating a configuration of the bicycle control system 500 in accordance with a fifth embodiment. The bicycle control system 500 is provided to the bicycle 1 in FIG. 2. The bicycle control system 500 comprises the first bicycle component 10 and the second bicycle component 20. The first bicycle component 10 and the second bicycle component 20 in accordance with the fifth embodiment have the same configuration as the first bicycle component 10 and the second bicycle component 20 in accordance with the first embodiment. However, output timing of the pairing demand signal is different between the fifth embodiment and the first embodiment. Thus, elements having substantially the same function as those in the first embodiment will be numbered the same here, and will not be described and/or illustrated again in detail here for the sake of brevity.

In the bicycle control system 500, one of the first and second bicycle components 10 and 20 is configured to wirelessly output the pairing demand signal to the other of the first and second bicycle components 10 and 20 in response to changing into a power-on state of the one of the first and second bicycle components 10 and 20. In this embodiment, as shown in FIG. 16, the one of the first and second bicycle components 10 and 20 is second bicycle component 20 and the other of the first and second bicycle components 10 and 20 is the first bicycle component 10.

As shown in FIG. 16, the bicycle control system 500 further comprises a power switch 55. The second bicycle component 20 is configured to change into the power-on state in response to a power-on operation to the power switch 55. The power switch 55 is provided separately from the first bicycle component 10 and the second bicycle component 20. For example, as shown in FIG. 2, the power switch 55 is mounted on the bicycle frame B1. The power switch 55 is connected to the second bicycle components 20 through the PLC 50. Therefore, it is possible for the second bicycle components 20 to communicate with the power switch 55 through the PLC 50.

In FIG. 16, when the power switch 55 receives the power-on operation, the second bicycle component 20 changes into the power-on state in response to the power-on operation. Also, the second bicycle component 20 wirelessly outputs the pairing demand signal to the first bicycle component 10 in response to changing into the power-on state of the second bicycle component 20.

Next, an operation of the bicycle control system 500 will be described based on a specific configuration example. The first bicycle component 10 and the second bicycle component 20 include any component which is mounted on the bicycle 1 and performs the wireless communication. In the specific configuration example, the first bicycle component 10 includes at least one shift operating device B20 and the second bicycle component 20 includes at least one bicycle shift device B10 or B11 (see, FIG. 2). The shift operating device B20 is configured to output a shift signal. The shift device B10 or B11 is configured to shift speed stages of the bicycle 1 in response to the shift signal.

In the following description, more specifically, the first bicycle component 10 is the shift operating device B20 and the second bicycle component 20 is the rear shift device B10.

Figure 17:
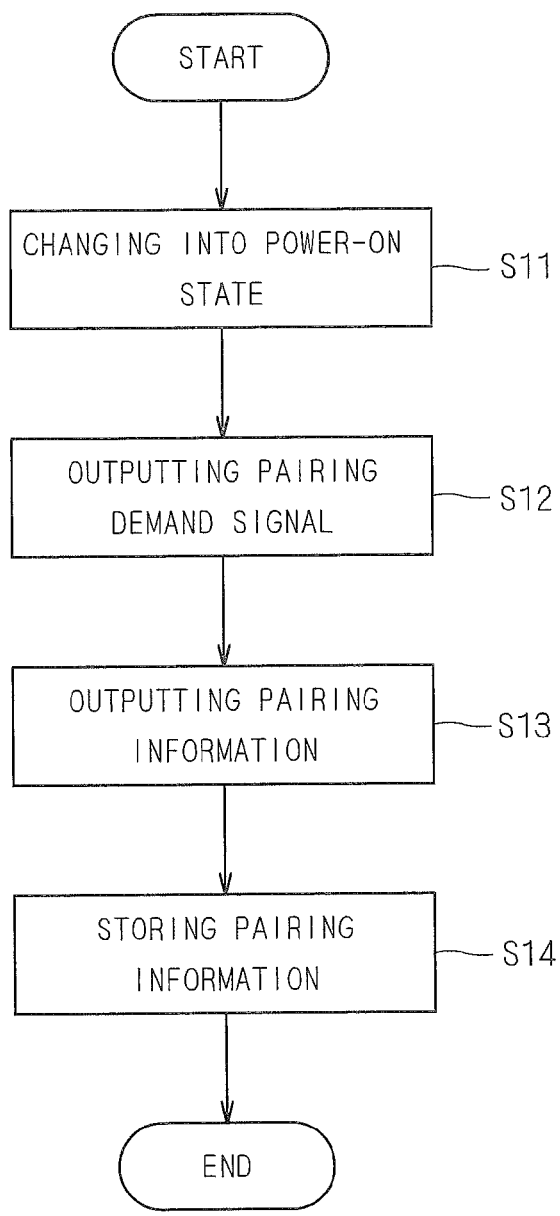
FIG. 17 is a diagram for explaining an operation of the bicycle control system in accordance with the fifth embodiment.

Referring to FIG. 17, in a case where the rear shift device B10 outputs the pairing demand signal to the shift operating device B20, the operation of the bicycle control system 500 will be described.

In FIG. 16, when the power switch 55 receives the power-on operation from the user, the power switch 55 sends a power-on signal to the second bicycle component 20 (the rear shift device B10) through the PLC 50. Then, the rear shift device B10 changes into the power-on state in response to the power-on operation (step S11). Also, the rear shift device B10 wirelessly outputs the pairing demand signal to the first bicycle component 10 (the shift operating device B20) in response to changing into the power-on state of the rear shift device B10 (step S12).

After step S12, the shift operating device B20 wirelessly receives the pairing demand signal. When the pairing demand signal has come from the pairing partner of the shift operating device B20, the shift operating device B20 wirelessly outputs the pairing information to the rear shift device B10 in response to receiving the pairing demand signal (step S13). The pairing information includes identification information data of the shift operating device B20.

After step S13, the rear shift device B10 wirelessly receives the pairing information. Then, the rear shift device B10 stores the pairing information in the memory 20B in FIG. 4 (step S14). The pairing between the shift operating device B20 and the rear shift device B10 is established through a series of processes (from step S11 to step S14).

With the bicycle control system 500, it is possible to start the pairing process without performing the particular operation for the pairing process. Accordingly, with the bicycle control system 500, the convenience of the user can be improved.

Figure 18:
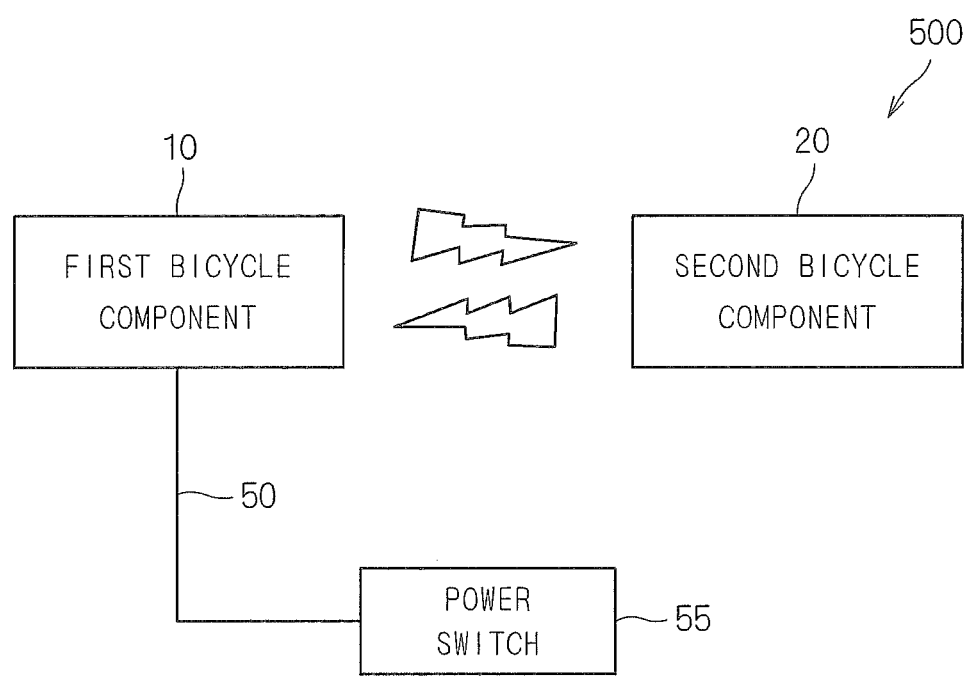
FIG. 18 is a block diagram illustrating an another configuration of the bicycle control system in accordance with a fifth embodiment.

Unlike FIG. 16, referring to FIG. 18, a configuration that the one of the first and second bicycle components 10 and 20 is first bicycle component 10 and the other of the first and second bicycle components 10 and 20 is the bicycle component 20 can be adopted, if needed and/or desired. In the configuration in FIG. 18, the first bicycle component 10 wirelessly outputs the pairing demand signal to the second bicycle component 20 in response to changing into the power-on state of the first bicycle component 10.

In the above description, the bicycle control system 500 includes the power switch 55. The one of the first and second bicycle components 10 and 20 is configured to change into the power-on state in response to the power-on operation to the power switch 55. However, the following configuration can be adopted, if needed and/or desired. Namely, the one of the first and second bicycle components 10 and 20 is configured to change into the power-on state in response to the one of the first and second bicycle components 10 and 20 being electrically connecting to the battery 30.

For example, referring FIG. 6, when the second bicycle component 20 is electrically connected with the battery 30, the second bicycle component 20 changes into the power-on state. In other words, the second bicycle component 20 changes into the power-on state in response to an electric connection between the second bicycle component 20 and the battery 30. Then, the second bicycle component 20 wirelessly outputs the pairing demand signal to the first bicycle component 20 in response to changing into the power-on state of the second bicycle component 20.

Sixth Embodiment

The bicycle control system 600 in accordance with a sixth embodiment has substantially the same configuration as the bicycle control system 500 in accordance with the fifth embodiment except for the following things. Thus, elements having substantially the same function as those in the first embodiment will be numbered the same here, and will not be described and/or illustrated again in detail here for the sake of brevity.

In the fifth embodiment, the power switch 55 is mounted on bicycle frame B1. Namely, the power switch 55 is provided outside of the first bicycle component 10 and the second bicycle component 20.

Figure 19:
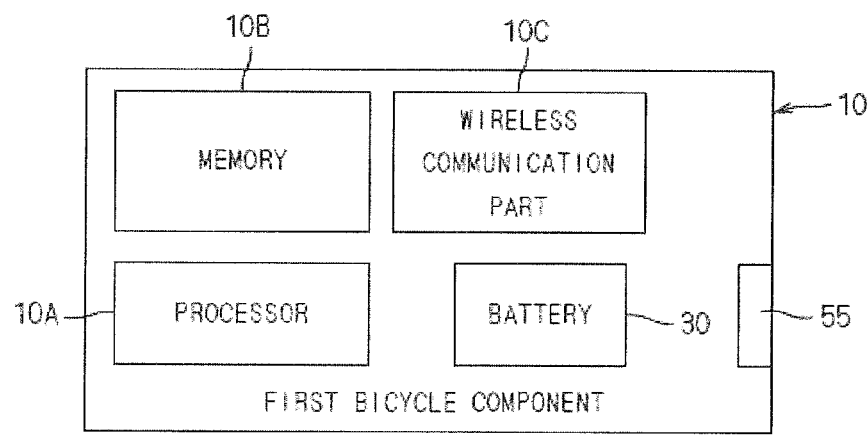
FIG. 19 is an enlarged block diagram illustrating a configuration of the first bicycle component.
Figure 20:
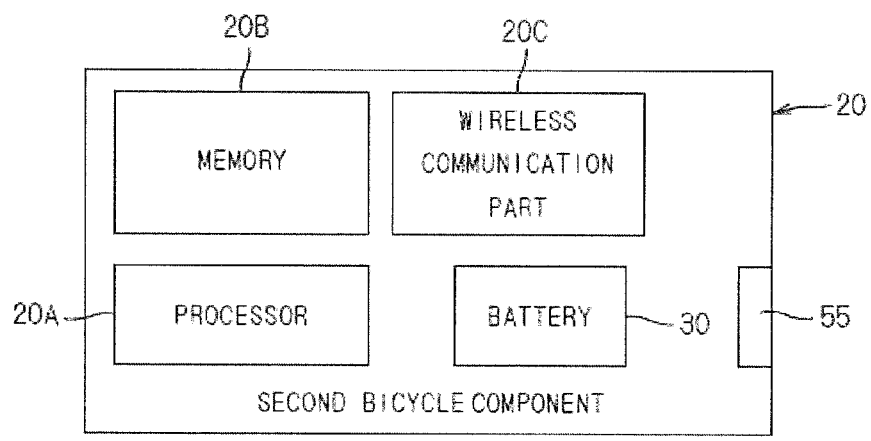
FIG. 20 is an enlarged block diagram illustrating a configuration of the second bicycle component.

In the bicycle control system 600 in accordance with the sixth embodiment, the one of the first and second bicycle components 10 and 20 includes the power switch 55. FIG. 8 is the block diagram illustrating a configuration of the bicycle control system 600. FIG. 19 is a block diagram illustrating a configuration of the first bicycle component 10 in accordance with the sixth embodiment. FIG. 20 is a block diagram illustrating a configuration of the second bicycle component 20 in accordance with the sixth embodiment.

As can be seen from FIGS. 19 and 20, the first bicycle component 10 includes the power switch 55, or the second bicycle component 20 includes the power switch 55.

In FIG. 19, when the power switch 55 receives the power-on operation from the user, the first bicycle component 10 changes into power-on state. Then, as show in FIG. 8, the first bicycle component 10 wirelessly outputs the pairing demand signal to the second bicycle component 20 in response to changing into the power-on state of the first bicycle component 10.

In FIG. 20, when the power switch 55 receives the power-on operation from the user, the second bicycle component 20 changes into power-on state. Then, as show in FIG. 8, the second bicycle component 20 wirelessly outputs the pairing demand signal to the first bicycle component 10 in response to changing into the power-on state of the second bicycle component 20.

Seventh Embodiment

Figure 21:
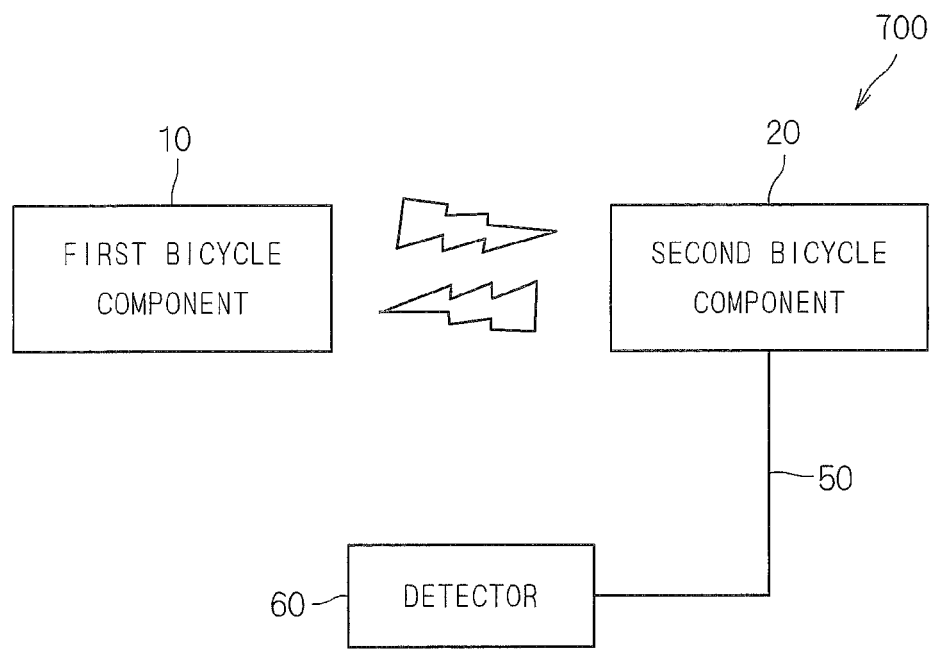
FIG. 21 is a block diagram illustrating a configuration of the bicycle control system in accordance with a seventh embodiment.

FIG. 21 is a block diagram illustrating a configuration of the bicycle control system 700 in accordance with a seventh embodiment. The bicycle control system 700 is provided to the bicycle 1 in FIG. 2. The bicycle control system 700 comprises the first bicycle component 10 and the second bicycle component 20. The first bicycle component 10 and the second bicycle component 20 in accordance with the seventh embodiment have the same configuration as the first bicycle component 10 and the second bicycle component 20 in accordance with the first embodiment. However, output timing of the pairing demand signal is different between the seventh embodiment and the first embodiment. Thus, elements having substantially the same function as those in the first embodiment will be numbered the same here, and will not be described and/or illustrated again in detail here for the sake of brevity.

As shown in FIG. 21, the bicycle control system 700 further comprises a detector 60. The detector 60 is configured to detect a load applied to the bicycle 1. The detector 60 is provided separately from the first bicycle component 10 and the second bicycle component 20. For example, as shown in FIG. 2, the detector 60 is provided to the bicycle frame B1 and detects the load applied to the bicycle frame B1. The detector 60 is connected to the second bicycle components 20 through the PLC 50. Therefore, it is possible for the second bicycle components 20 to communicate with the detector 60 through the PLC 50.

In the bicycle control system 700, one of the first and second bicycle components 10 and 20 is configured to wirelessly output the pairing demand signal to the other of the first and second bicycle components 10 and 20 in response to detecting the load of the detector 55. In this embodiment, as shown in FIG. 21, the one of the first and second bicycle components 10 and 20 is second bicycle component 20 and the other of the first and second bicycle components 10 and 20 is the first bicycle component 10.

In FIG. 21, when the user rides on the bicycle 1, the detector 60 detects the load applied to the bicycle 1. Then, the second bicycle component 20 wirelessly outputs the pairing demand signal to the first bicycle component 10 in response to the detecting the load of the detector 60.

Next, an operation of the bicycle control system 700 will be described based on a specific configuration example. The first bicycle component 10 and the second bicycle component 20 include any component which is mounted on the bicycle 1 and performs the wireless communication. In the specific configuration example, the first bicycle component 10 includes at least one shift operating device B20 and the second bicycle component 20 includes at least one bicycle shift device B10 or B11 (see, FIG. 2). The shift operating device B20 is configured to output a shift signal. The shift device B10 or B11 is configured to shift speed stages of the bicycle 1 in response to the shift signal.

In the following description, more specifically, the first bicycle component 10 is the shift operating device B20 and the second bicycle component 20 is the rear shift device B10.

Figure 22:
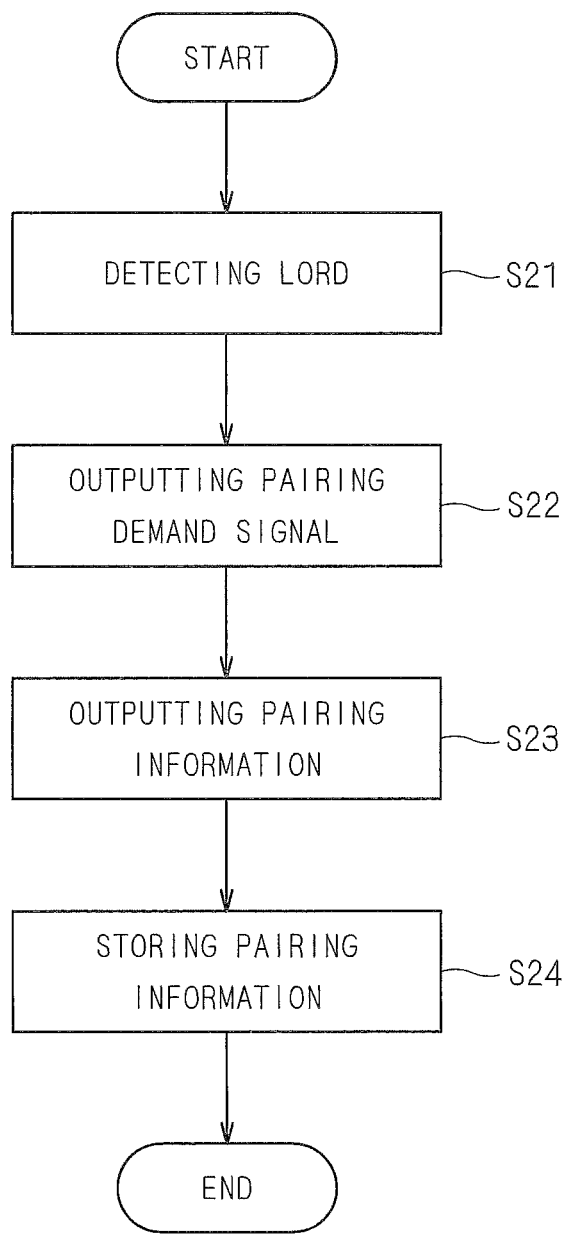
FIG. 22 is a diagram for explaining an operation of the bicycle control system in accordance with the seventh embodiment.

Referring to FIG. 22, in the case where the rear shift device B10 outputs the pairing demand signal to the shift operating device B20, the operation of the bicycle control system 700 will be described. In the following description of the operation, the detector 60 is provided to the bicycle frame B1 (see, FIG. 2).

In FIGS. 2 and 21, when the user rides on the bicycle 1, the load is applied to the bicycle 1 (including the bicycle frame B1). Therefore, the detector 60 detects the load applied to the bicycle frame B1 (step S21). Then, the detector 60 sends a load-applying signal to the second bicycle 20 (the rear shift device B10) through the PLC 50. Next, the rear shift device B10 wirelessly outputs the pairing demand signal to the first bicycle component 10 (the shift operating device B20) in response to receiving the load-applying signal at the rear shift device B10 (step S22).

After step S22, the shift operating device B20 wirelessly receives the pairing demand signal. When the pairing demand signal has come from the pairing partner of the shift operating device B20, the shift operating device B20 wirelessly outputs the pairing information to the rear shift device B10 in response to receiving the pairing demand signal (step S23). The pairing information includes identification information data of the shift operating device B20.

After step S23, the rear shift device B10 wirelessly receives the pairing information. Then, the rear shift device B10 stores the pairing information in the memory 20B in FIG. 4 (step S24). The pairing between the shift operating device B20 and the rear shift device B10 is established through a series of processes (from step S21 to step S24).

With the bicycle control system 700, it is possible to start the pairing process without performing the particular operation for the pairing process. Accordingly, with the bicycle control system 700, the convenience of the user can be improved.

Figure 23:
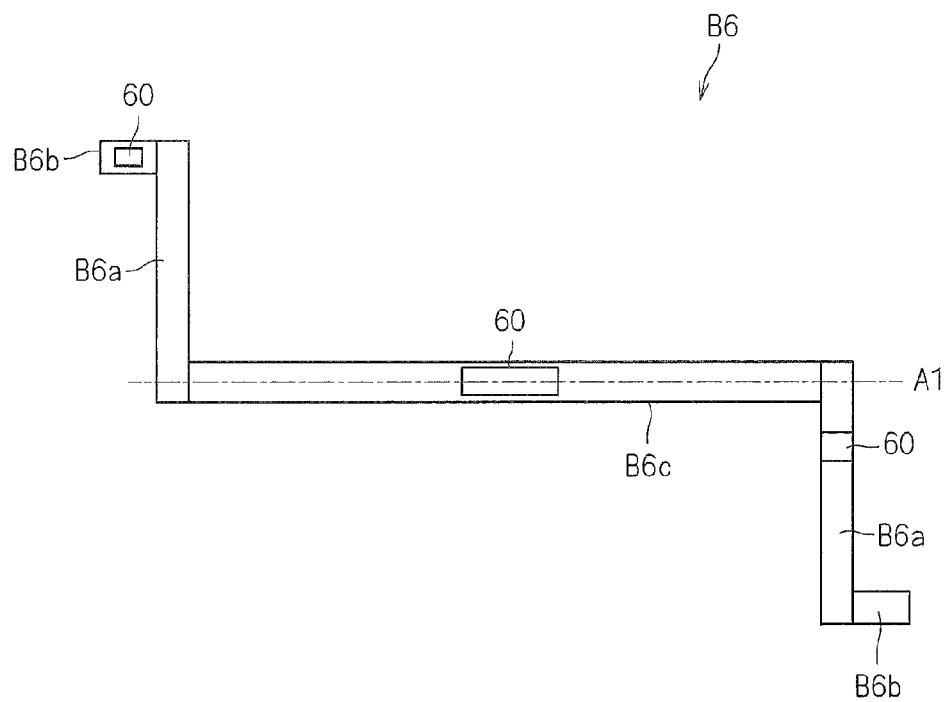
FIG. 23 is an enlarged view of a crank assembly viewed from above.

The detector 60 can be provided to any part of the bicycle 1. For example, as shown FIG. 2, the detector 60 can be provided to the crank assembly B6 of the bicycle 1 and detect the load applied to the crank assembly B6. When the user puts his or her foot on a pedal B6b of the crank assembly B6, the load is applied to the crank assembly B6. As shown in FIG. 23, the crank assembly B6 includes crank arms B6a, pedals B6b, and a crank axle B6c. The detector 60 can be provided to at least one of the crank arms B6a, the pedals B6b, and a crank axle B6c.

Figure 24:
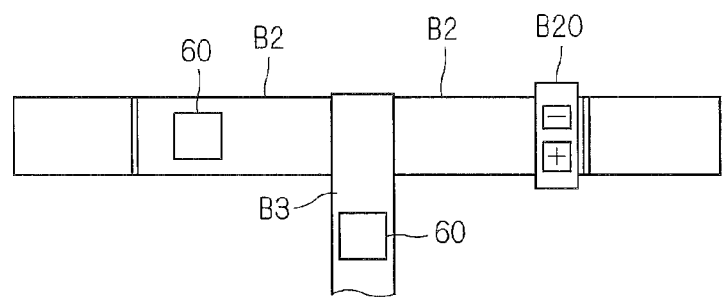
FIG. 24 is an enlarged view of a handlebar viewed from above.

As shown FIG. 24, the detector 60 can be provided to the handlebar B2 of the bicycle 1 and detect the load applied to the handlebar B2. When the user puts his or her hand on the handlebar B2 or the stem B3, the load is applied to the handlebar B2. Also, the detector 60 can be provided to the stem B3 of the bicycle 1 and detect the load applied to the stem B3. When the user put his or her hand on the handlebar B2 or the stem B3, the load is applied to the stem B3.

As shown FIG. 2, the detector 60 can be provided to the saddle B12 of the bicycle 1 and detect the load applied to the saddle B12. When the user sits on the saddle B12, the load is applied to the saddle B12. Also, the detector 60 can be provided to the suspension B13 of the bicycle 1 and detect the load applied to the suspension B13. When the user puts his or her hand on the handlebar B2 or the stem B3 or sits on the saddle B12, the load is applied to the suspension B13.

Figure 25:
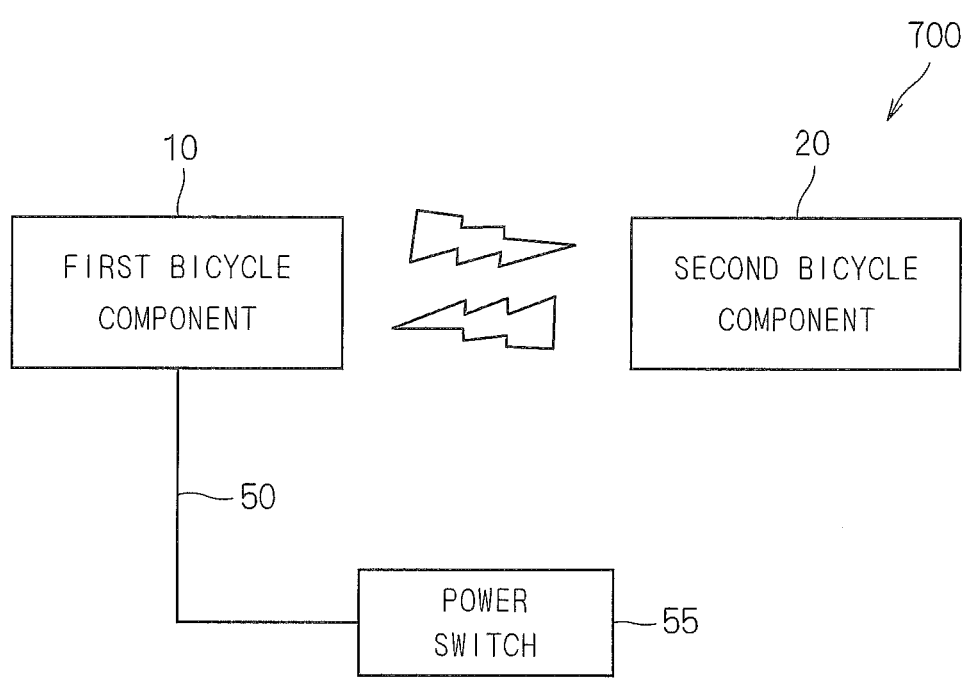
FIG. 25 is a block diagram illustrating an another configuration of the bicycle control system in accordance with the seventh embodiment.

Unlike FIG. 21, referring to FIG. 25, a configuration that the one of the first and second bicycle components 10 and 20 is first bicycle component 10 and the other of the first and second bicycle components 10 and 20 is the bicycle component 20 can be adopted, if needed and/or desired. In the configuration in FIG. 25, the first bicycle component 10 wirelessly outputs the pairing demand signal to the second bicycle component 20 in response to detecting the load of the detector 60.

In FIGS. 21 and 25, the detector 60 is connected with the first bicycle component 10 or the second bicycle component 20 through PLC 50. However, the detector 60 can be configured to perform wireless communication with the first bicycle component 10 or the second bicycle component 20 to output and input data and signals.

Eighth Embodiment

The bicycle control system in accordance with an eighth embodiment further comprises a memory. The memory is configured to store the pairing information. The pairing information is related to the pairing between the first bicycle component 10 and the second bicycle component 20. For example, the pairing information includes identification data of the first and second bicycle components 10 and 20 and includes data (hereafter referred to as pairing-processing end data) representing that the pairing process has been finished.

The memory that stores the pairing information can be provided to any place of bicycle 1 separately from the first bicycle component 10 and the second bicycle component 20. For example, the memory can be provided to the bicycle frame B1. Instead, as shown in FIGS. 3 and 4, the first bicycle component 10 has the memory 10B that stores the pairing information and the second bicycle component 20 has the memory 20B that stores the pairing information. In the descriptions below, the memory 10B and the memory 20B are the memory that stores the pairing information.

In this embodiment, the one of the first and second bicycle components 10 and 20 is configured to be prohibited to output the pairing demand signal if the memory 10A or 10B stores the pairing information related to the first and second bicycle components 10 and 20. The one of the first and second components 10 and 20 is a bicycle component that outputs the pairing demand signal. The other of the first and second components 10 and 20 is a bicycle component that receives the pairing demand signal. In the descriptions below, the one of the first and second components 10 and 20 is the second bicycle component 20, and the other of the first and second components 10 and 20 is the first bicycle component 10.

As described above, the second bicycle component 20 that outputs the pairing demand signal receives the pairing information from the first bicycle component 10 and stores the pairing information in the memory 20B. For example, the pairing information in the memory 20B includes the identification data of the first bicycle component 10 and the pairing-processing end data. On the other hand, when the first bicycle component 10 outputs the pairing information to the second bicycle component 20, the first bicycle component 10 stores the pairing information in the memory 10B. For example, the pairing information in the memory 10B includes the identification data of the second bicycle component 20 and the pairing-processing end data. The pairing demand signal from the second bicycle component 20 includes the identification data of the second bicycle component 20.

When the memory 20B stores the pairing information related to the first bicycle components 10, the second bicycle components 20 does not output the pairing demand signal to the first bicycle component 10. More specifically, when the memory 20B stores the pairing information, even if the battery 30 is charged, the second bicycle component 20 changes into the power-on state, and the detector 60 detects the load to the bicycle 1, the second bicycle components 20 does not output the pairing demand signal.

Figure 26:
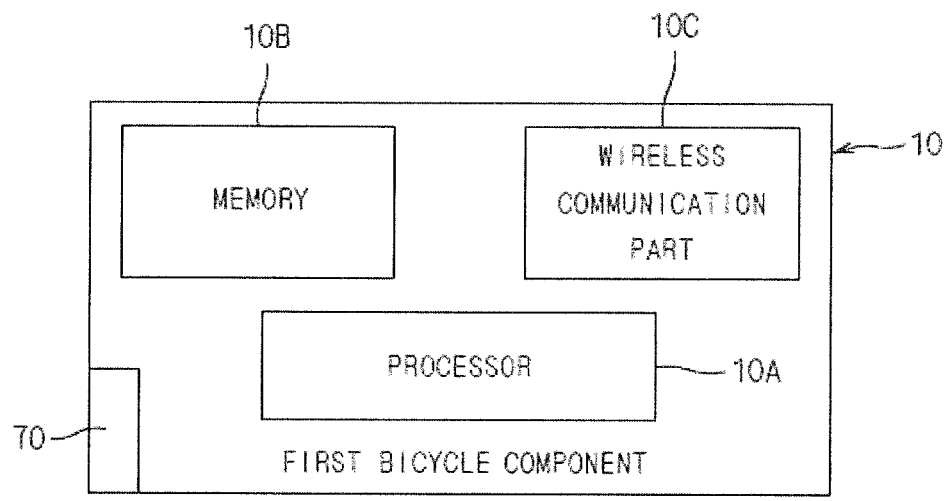
FIG. 26 is an enlarged block diagram illustrating a configuration of the first bicycle component.
Figure 27:
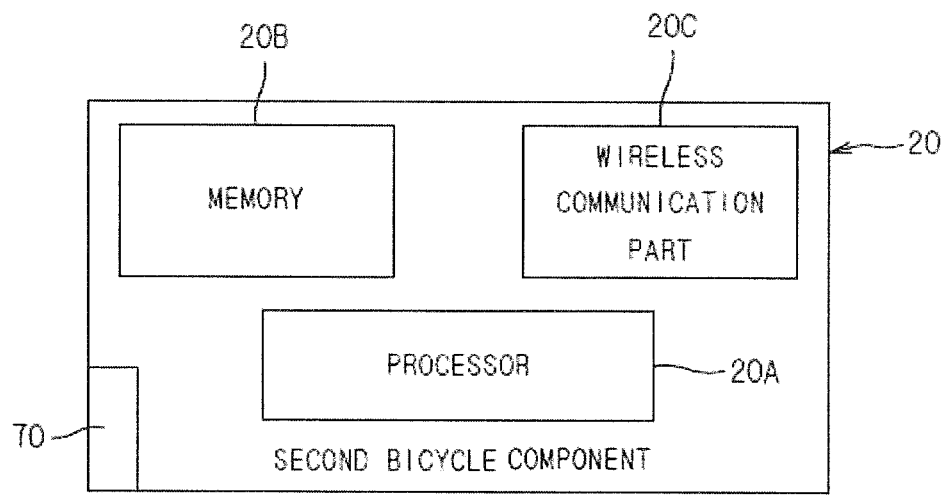
FIG. 27 is an enlarged block diagram illustrating a configuration of the second bicycle component.

As shown in FIG. 2, a reset switch 70 can be mounted on the bicycle 1 (for example, on the bicycle frame B1). Instead, as shown in FIGS. 25 and 26, the reset switches 70 can be provided to the first bicycle component 10 and the second bicycle component 20. The resect switch 70 is configured to receive a reset operation from the user. When the resect switch 70 receives the reset operation, the pairing information in the memory is deleted. Therefore, after receiving the reset operation, the pairing process restarts (see, FIGS. 7, 17, and 22).

For example, when the reset switch 70 mounted on the bicycle frame B1 receives the reset operation, the pairing information in the memory 10B and the pairing information in the memory 20B are deleted. Therefore, for example, the second bicycle component 20 outputs the pairing demand signal to the first bicycle component 10 in response to charging of the battery 30, in response to changing into the power-on state of the one of the first and second bicycle components 10 and 20, or in response to detecting the load of the detector 70.

Ninth Embodiment

In this embodiment, the other of the first and second bicycle components 10 and 20 is configured to be prohibited to respond to the pairing demand signal if the memory 10A or 10B stores the pairing information related to the first and second bicycle components 10 and 20. The one of the first and second components 10 and 20 is the bicycle component that outputs the pairing demand signal. The other of the first and second components 10 and 20 is the bicycle component that receives the pairing demand signal. In the descriptions below, the one of the first and second components 10 and 20 is the second bicycle component 20, and the other of the first and second components 10 and 20 is the first bicycle component 10.

As described above, when the first bicycle component 10 outputs the pairing information to the second bicycle component 20 in response to the pairing demand signal, the first bicycle component 10 stores the pairing information in the memory 10B. For example, the pairing information in the memory 10B includes the identification data of the second bicycle component 20 and the pairing-processing end data. The pairing demand signal from the second bicycle component 20 includes the identification data of the second bicycle component 20.

When the memory 10B stores the pairing information related to the second bicycle components 20, the first bicycle components 10 does not respond to the pairing demand signal from the second bicycle component 20. More specifically, when the first bicycle components 10 receives the pairing demand signal in a state where the pairing information is stored in the memory 10B, the first bicycle components 10 does not output the pairing information to the second bicycle component 20 and discards the pairing demand signal.

As shown in FIG. 2, the reset switch 70 can be mounted on the bicycle 1 (for example, on the bicycle frame B1). Instead, as shown in FIGS. 25 and 26, the reset switches 70 can be provided to the first bicycle component 10 and the second bicycle component 20. The resect switch 70 is configured to receive the reset operation from the user. When the resect switch 70 receives the reset operation, the pairing information in the memory is deleted. Therefore, after receiving the reset operation, the pairing process restarts (see, FIGS. 7, 17, and 22).

For example, when the reset switch 70 mounted on the bicycle frame B1 receives the reset operation, the pairing information in the memory 10B and the pairing information in the memory 20B are deleted. Therefore, for example, when the first bicycle components 10 receives the pairing demand signal after the reset switch 70 receives the reset operation, the first bicycle components 10 outputs the pairing information to the second bicycle component 20 in response to the pairing demand signal.

In the above embodiments, the identification information is stored in the memory to establish the pairing. The identification information can be managed by the user using an external device such as a personal computer and a portable electric device. For example, bicycle components such as the first and second bicycle components 10 and 20 have several types and/or grades to be adapted to the user's needs and/or types of bicycles. The identification information can include adaption information to determine whether a bicycle component is permitted to be used along with another bicycle component as a single unit for the same bicycle. Examples of the adaption information include a type of the bicycle component and a series of the bicycle component. In such an embodiment, for example, the pairing can be established between the first and second bicycle components 10 and 20 only when the adaption information of the first and second bicycle components 10 and 20 indicates that the first and second bicycle components 10 and 20 are permitted to be used together as the single unit for the same bicycle.

Furthermore, the adaption information can be changed and/or updated using the external device. In such an embodiment, for example, an application program is installed in the external device. The application program is configured to allow the user to change and/or update the adaption information. When the user changes the adaption information via the external device, the user can select types and/or series of other bicycle components which are permitted by the user to be used along with the bicycle component connected to the external device. The selected types and/or series are stored in the memory as the adaption information. The adaption information stored in the bicycle component can be updated via internet using the external device without updating firmware of the bicycle component. It is possible to manage the pairing established between the bicycle components since the identification information includes the adaption information.

It will be apparent to those skilled in the bicycle field from the present disclosure that the constructions of the above embodiments can be at least partially combined with each other if needed and/or desired.

In the present application, the term "comprising" and its derivatives, as used herein, are intended to be open ended terms that specify the presence of the stated features, elements, components, portions, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, portion, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle control system comprising:
a first bicycle component configured to be mounted to a bicycle and to perform wireless communication; and
a second bicycle component configured to be mounted to the bicycle and to perform wireless communication, at least one of the first and second bicycle components configured to be electrically connected to a battery, one of the first and second bicycle components configured to wirelessly output a pairing demand signal to the other of the first and second bicycle components in response to charging of the battery.

2. The bicycle control system according to claim 1, further comprising
the battery and a plug receiver configured to receive an electric plug for charging the battery wherein
the one of the first and second bicycle components is configured to wirelessly output the pairing demand signal to the other of the first and second bicycle components in response to receiving the plug at the plug receiver.

3. The bicycle control system according to claim 2, wherein
one of the first and second bicycle components includes the battery and the plug receiver.

4. The bicycle control system according to claim 1, further comprising
the battery and a wireless charging part configured to wirelessly receive electricity for charging the battery wherein
the one of the first and second bicycle components is configured to wirelessly output the pairing demand signal to the other of the first and second bicycle components in response to the charging of the battery via the wireless charging part.

5. The bicycle control system according to claim 4, wherein
one of the first and second bicycle components includes the battery and the wireless charging part.

6. A bicycle control system comprising:
a first bicycle component configured to be mounted to a bicycle and to perform wireless communication;
a second bicycle component configured to be mounted to the bicycle and to perform wireless communication, one of the first and second bicycle components configured to wirelessly output a pairing demand signal to the other of the first and second bicycle components in response to changing into a power-on state of the one of the first and second bicycle components.

7. The bicycle control system according to claim 6, further comprising a power switch wherein
the one of the first and second bicycle components is configured to change into the power-on state in response to a power-on operation to the power switch.

8. The bicycle control system according to claim 7, wherein
the one of the first and second bicycle components includes the power switch.

9. The bicycle control system according to claim 6, wherein
the one of the first and second bicycle components is configured to change into the power-on state in response to the one of the first and second bicycle components being electrically connecting to a battery.

10. A bicycle control system comprising:
a first bicycle component configured to be mounted to a bicycle and to perform wireless communication;
a second bicycle component configured to be mounted to the bicycle and perform wireless communication; and
a detector configured to detect a load applied to the bicycle, one of the first and second bicycle components configured to wirelessly output a pairing demand signal to the other of the first and second bicycle components in response to detecting the load of the detector.

11. The bicycle control system according to claim 10, wherein
the detector is provided to a crank assembly of the bicycle and detects the load applied to the crank assembly.

12. The bicycle control system according to claim 10, wherein
the detector is provided to a bicycle frame of the bicycle and detects the load applied to the bicycle frame.

13. The bicycle control system according to claim 10, wherein
the detector is provided to a handlebar of the bicycle and detects the load applied to the handlebar.

14. The bicycle control system according to claim 10, wherein
the detector is provided to a stem of the bicycle and detects the load applied to the stem.

15. The bicycle control system according to claim 10, wherein
the detector is provided to a saddle of the bicycle and detects the load applied to the saddle.

16. The bicycle control system according to claim 10, wherein
the detector is provided to a suspension of the bicycle and detects the load applied to the suspension.

17. The bicycle control system according to claim 1, wherein
the first bicycle component includes at least one shift operating device configured to output a shift signal and the second bicycle component includes at least one bicycle shift device configured to shift speed stages of the bicycle in response to the shift signal.

18. The bicycle control system according to claim 6, wherein
the first bicycle component includes at least one shift operating device configured to output a shift signal and the second bicycle component includes at least one bicycle shift device configured to shift speed stages of the bicycle in response to the shift signal.

19. The bicycle control system according to claim 10, wherein
the first bicycle component includes at least one shift operating device configured to output a shift signal and the second bicycle component includes at least one bicycle shift device configured to shift speed stages of the bicycle in response to the shift signal.

20. The bicycle control system according to claim 1, further comprising a memory configured to store pairing information wherein
the one of the first and second bicycle components configured to be prohibited to output the pairing demand signal if the memory stores pairing information related to the first and second bicycle components.

21. The bicycle control system according to claim 1, further comprising a memory configured to store pairing information wherein
the other of the first and second bicycle components configured to be prohibited to respond to the pairing demand signal if the memory stores pairing information related to the first and second bicycle components.

22. The bicycle control system according to claim 6, further comprising a memory configured to store pairing information wherein
the one of the first and second bicycle components configured to be prohibited to output the pairing demand signal if the memory stores pairing information related to the first and second bicycle components.

23. The bicycle control system according to claim 6, further comprising a memory configured to store pairing information wherein
the other of the first and second bicycle components configured to be prohibited to respond to the pairing demand signal if the memory stores pairing information related to the first and second bicycle components.

24. The bicycle control system according to claim 10, further comprising a memory configured to store pairing information wherein
the one of the first and second bicycle components configured to be prohibited to output the pairing demand signal if the memory stores pairing information related to the first and second bicycle components.

25. The bicycle control system according to claim 10, further comprising a memory configured to store pairing information wherein
the other of the first and second bicycle components configured to be prohibited to respond to the pairing demand signal if the memory stores pairing information related to the first and second bicycle components.

* * * * *